United States Patent Office 3,369,032
Patented Feb. 13, 1968

3,369,032
METHYL-3β-ACETOXY-16-KETOBURICO-
8,24(28)-DIEN-21-OATE
Patrick A. Diassi, Westfield, and Pacifico A. Principe,
South River, N.J., assignors to E. R. Squibb & Sons Inc.,
New York, N.Y., a corporation of Delaware
No Drawing. Filed Oct. 31, 1966, Ser. No. 590,560
1 Claim. (Cl. 260—397.1)

This invention relates to and has for its object the provision of new physiologically active compounds and intermediates thereof. More particularly, this invention relates to compounds having the formula

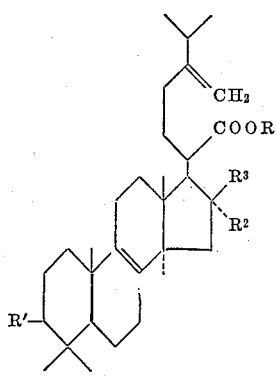

wherein R is selected from the group consisting of hydrogen and lower alkyl; and $R^1$ is acyloxy; $R^2$ is hydroxy and $R^3$ is hydrogen and $R^2$ and $R^3$ together are oxo (O=), and physiological salts thereof.

The preferred acyl radicals are those of hydrocarbon carboxylic acids of less than twelve carbon atoms and may be exemplified by the lower alkanoic acids (e.g., acetic, propionic, butyric and tert-pentanoic acids), the lower alkenoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The final products of this invention are physiologically active steroids which possess anti-androgenic activity, i.e., they inhibit the action of androgens, and they may be employed in the treatment of such conditions as hyperandrogenic acne. The compounds may be formulated for such administration, the concentration and/or dosage being based on the activity of the particular compound and the requirements of the patient being treated, as more particularly pointed out in copending application Ser. No. 590,556, filed on the same date as this application.

The final products of the invention are prepared by fermentations of microorganisms of the genera Fomes, Polyporus and Poria, such fermentations being carried out in a manner similar to that disclosed in U.S. Patent No. 3,010,878. Methyl tumulosate 3-acetate is recovered from the fermentation broth by known procedures and may be oxidized by utilizing an oxidizing agent such as chromic anhydride to form the 16-oxo derivative of this invention. This derivative may be utilized as the starting material in the preparation of higher acyl derivatives of the invention. The 16-oxo intermediate may be hydrolyzed with ethanolic sodium hydroxide or ethanolic potassium hydroxide at room temperature to yield a 3-hydroxy-16-oxo derivative. This 3-ol intermediate may then be treated with an acid anhydride or acid chloride in the presence of pyridine to yield the desired higher acyl derivatives of the invention. The following examples are illustrative of this invention. All temperatures are in degrees centigrade unless otherwise stated.

EXAMPLE 1

Methyl tumulosate and methyl tumulosate 3-acetate

Surface growth from a two-week-old agar slant of Fomes pinicola (C.B.S.) (Centraalbureau Voor Schimmel Cultures, Baarn, Netherlands), the slant containing as a nutrient medium, Bacto Malt Agar (Difco Laboratories, Detroit, Mich.) is suspended in 5 ml. of 0.01% aqueous sodium lauryl sulfate solution. One ml. portions of this suspension are used to inoculate four 250 ml. Erlenmeyer flasks each containing 50 ml. of the following sterilized medium (A):

| | G. |
|---|---|
| Soy bean meal | 15 |
| Dehydrated mashed potato | 15 |
| Glucose | 30 |
| Distilled water to 1 liter. | |

After seven days incubation at 25° with continuous rotary agitation (280 cycles/minute; two-inch stroke), 10% (vol./vol.) transfers are made to twelve 250 ml. Erlenmeyer flasks each containing 50 ml. of freshly sterilized medium A. After six days of further incubation, using the same conditions as described above 20% (vol./vol.) transfers are made to ten 2 liter Erlenmeyer flasks each containing 500 ml. of the following sterilized medium (B):

| | G. |
|---|---|
| Soy bean meal | 15 |
| Glucose | 25 |
| Distilled water to 1 liter. | |

After eight days of further incubation, using identical conditions as described above, the contents of the flasks are pooled and the broth was filtered through 2 layers of coarse filter paper. After filtration the mycelial cake was air dried prior to extraction.

The mycelial cake is dried, pulverized and extracted with chloroform using a soxhlet. The chloroform is evaporated and the residue triturated several times with hexane. The insoluble residue is then treated with an ethereal solution of diazomethane until the yellow color of the diazomethane persists. It is filtered and the solvent evaporated. The residue is then plate chromatographed on alumina (Activity V) using chloroform-hexane (4:1, v.:v.) as the developing solvent. The bands at Rƒ≈0.4 and Rƒ≈0.6 detectable with iodine vapor are separated and eluted with ethyl acetate which is evaporated and the residues crystallized from acetone-hexane. From the less polar band is obtained methyl tumulosate 3-acetate having a melting point about 166–168°, $[\alpha]_D \tau_{CDCl_3}^{Si(CH_3)_4}$ 9.27 (s, 18—CH$_3$)

9.02 (s, 19—CH$_3$), 9.11 (s, 4α—CH$_3$, 4β—CH$_3$), 8.88=(s, 14α—CH$_3$), 8.79 (d, J=7 cps., 27—CH$_3$, 28—CH$_3$), 7.96 (s, 3—ORc), 6.33 (s, —COOCH$_3$), 5.53 (s, 3α—R), 5.23, 5.28 (24=CH$_2$).

From the more polar band is obtained methyl tumulosate having a melting point of 164–165° C.

EXAMPLE 2

Methyl 3β-acetoxy-16-ketoeburico-8,24(28)-dien-21-oate

To a solution of 50 mg. of methyl tumulosate 3-acetate in 5 ml. of reagent grade acetone is added dropwise an acetone-water solution (9:1, v.:v.) containing 20 mg./ml. of chromic anhydride and 32 mg./ml. of sulfuric acid until the solution is no longer decolorized. After twenty-five minutes the excess oxidizing agent is decomposed with a few drops of methanol, the solution diluted with water and extracted with chloroform. The chloroform solution is washed with water and evaporated. The residue on crystallization from acetone-hexane gives 31 mg. of methyl 3β - acetoxy-16-ketoeburico-8,24(28)-dien-21-oate having a melting point about 174–175°;

$[\alpha]_D^{22}$ −39°; $\lambda_{max.}^{nujol}$ 5.80, 6.10, 8.02 μ; $\tau_{CDCl_3}^{Si(CH_3)_4}$ 9.17 (s, 18—CH$_3$)

9.10 (s, 4α+4β—CH$_3$), 8.96 (s, 19—CH$_3$), 8.98 (d, 6.32 (s, —OCH$_3$), 5.47 (m, 3α—H), 5.24 (Br—CH$_2$). 6.32 (s, —OCH$_3$), 5.47 (m, 3α—H), 5.24 (br, =CH$_2$).

*Anaylsis.*—Calc'd for C$_{34}$H$_{52}$O$_5$ (540.76): C, 75.51; H, 9.69. Found: C, 75.60; H, 9.56.

EXAMPLE 3

*Methyl 3β-hydroxy-16-ketoeburico-8,24(28)-dien-21-oate*

To a solution of 100 mg. of methyl 3β-acetoxy-16-ketoeburico-8,24(28)-dien-21-oate in 25 ml. of dioxane is added 12.5 ml. of 1.5 N potassium hydroxide in methanol. After three hours at room temperature the mixture is nuetralized with 6 N sulfuric acid, diluted with water and extracted with chloroform. The chloroform solution is washed with water and evaporated. Crystallization of the residue gives methyl 3β-hydroxy-16-keto-eburico-8,24(28)-dien-21-oate.

EXAMPLE 4

*Methyl 3β-propionyloxy-16-ketoeburico-8,24(28)-dien-21-oate*

The solution of 100 mg. of methyl 3β-hydroxy-16-ketoeburico-8,24(28)-diene-21-oate in 5 ml. of dry pyridine and 2 ml. of propionic anhydride is allowed to remain at room temperature for eighteen hours. Ice is then added and the mixture is slowly diluted with water. The resulting precipitate is filtered, washed thoroughly with water and dried. Recrystallization from ethanol gives methyl 3β-propionyloxy-16-ketoeburico-8,24(28)-dien-21-oate.

The invention may be variously otherwise embodied within the scope of the appended claim.

What is claimed is:

1. A compound having the name methyl 3β-acetoxy-16-ketoeburico-8,24(28)-dien-21-oate.

References Cited

UNITED STATES PATENTS 3,133,057   5/1964   Rosenthal et al. ____ 260—397.1

ELBERT L. ROBERTS, *Primary Examiner.*

UNITED STATES PATENT OFFICE
CERTIFICATE OF CORRECTION

Patent No. 3,369,032            February 13, 1968

Patrick A. Diassi et al.

It is hereby certified that error appears in the above numbered patent requiring correction and that the said Letters Patent should read as corrected below.

In the heading to the printed specification, line 2, for "KETOBURICO" read -- KETOEBURICO --; column 2, line 55, for "(s, 3-ORc)" read -- (s, 3-OAc) --; line 56, for "(s, 3α-R)" read -- (s, 3α-H) --; column 3, line 8, strike out "6.32 (s, -OCH$_3$), 5.47 (m, 3α-H), 5.24 (Br-CH$_2$)." and insert instead -- 26+27-CH$_3$), 8.91 (s, 14α-CH$_3$), 7.95 (s, 3β-OAc), --; line 21, for "nuetralized" read -- neutralized --.

Signed and sealed this 13th day of May 1969.

(SEAL)
Attest:

Edward M. Fletcher, Jr.
Attesting Officer

Commissioner of Patents